April 5, 1949.  G. K. C. HARDESTY  2,466,026
PRESSUREPROOF GLAND
Filed Aug. 12, 1944
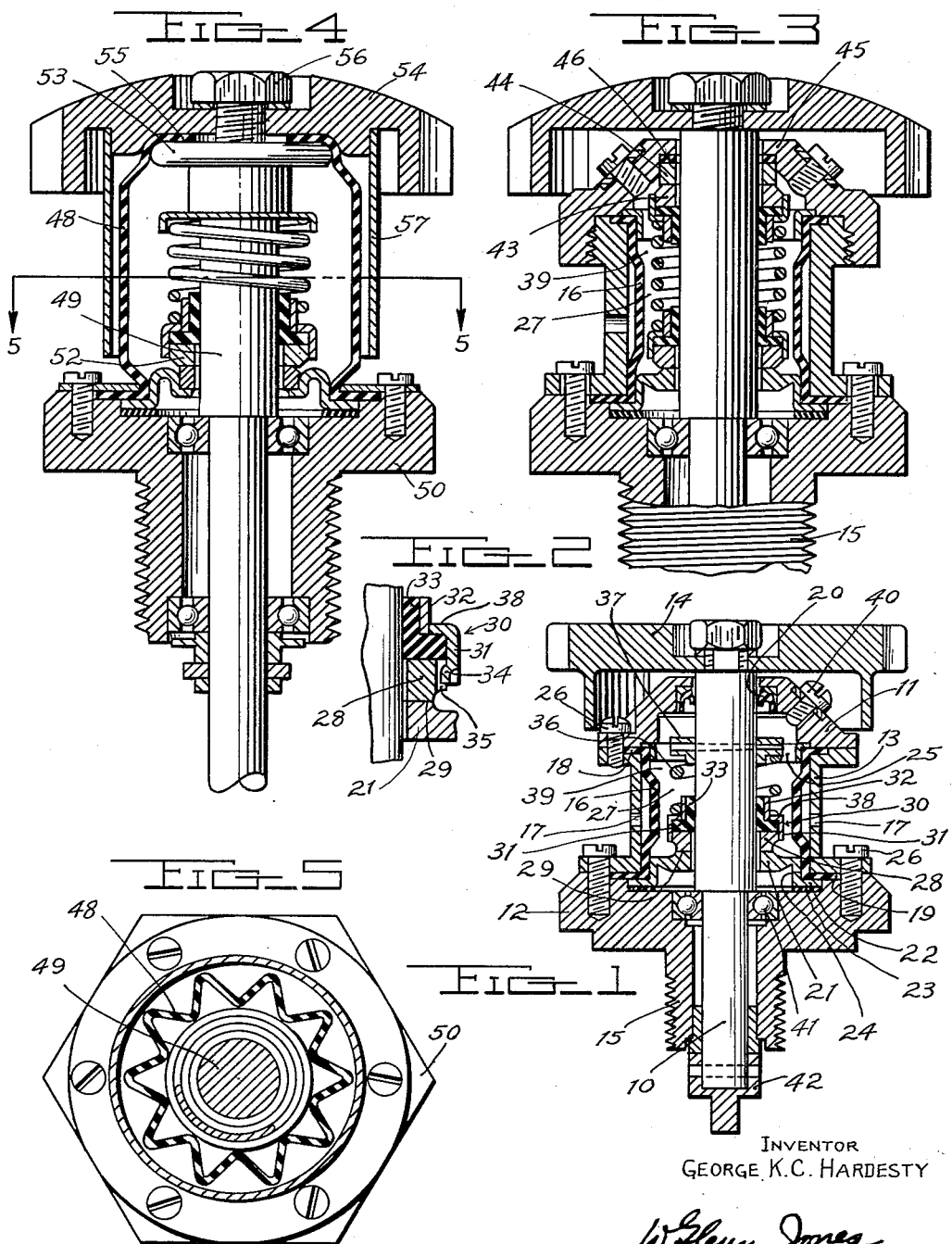
INVENTOR
GEORGE K.C. HARDESTY
BY W. Glenn Jones
ATTORNEY Patented Apr. 5, 1949

2,466,026

UNITED STATES PATENT OFFICE 2,466,026

PRESSUREPROOF GLAND

George K. C. Hardesty, Seat Pleasant, Md.

Application August 12, 1944, Serial No. 549,249

3 Claims. (Cl. 286—9)

(Granted under the act of March 3, 1883, as amended April 30, 1928; 370 O. G. 757)

The present invention relates in general to pressure proof glands for use in pressure-proofing the juncture between a partition separating high and low pressure zones and a shaft passing through such a partition.

An important object is the provision of a lubricated pressure gland particularly adapted for use in connection with submarines where components within the submarine or within a casing on the submarine are to be mechanically controlled by external operating means while the submarine is surfaced, where the mechanical transmission means between the external and internal space must be pressure-proofed against considerably high pressure differentials when the submarine is submerged, and where the fluid, salt water, in the outer or high-pressure zone is of a corrosive nature and must be excluded from contact with the primary or main sealing elements.

Another object is the provision of a pressure-gland which shall be substantially unaffected by variations in or reversal of a pressure differential, between the zones separated by the pressure-gland, due to temperature changes.

Another object is the provision of a device of the above character which shall be simple and sturdy, and will not require precise mechanical work such as the grinding and lapping of conical sealing surfaces.

Various other objects and advantages of the invention will become apparent upon a perusal of the following specification and the drawings accompanying the same.

In the drawings:

Fig. 1 is an axial cross section of a preferred form of the invention.

Fig. 2 is a fragmentary section on a large scale of a portion of the seal ring holder.

Fig. 3 is an axial cross section of a modification.

Fig. 4 is an axial cross section of a further modification applicable to an oscillating shaft of limited angular movement.

Fig. 5 is a section on the line 5—5 of Fig. 4.

Referring to the drawing in detail and first to Fig. 1, there is here shown a preferred form of the pressure-proof gland device in cross section taken axially, with the shaft 10 in vertical side elevation. Upper and lower end-wall members 11 and 12 connected by a cylindrical side wall member 13 form a housing through which the shaft passes from outside the housing where connected with a hand control knob 14, into any pressure-proofed enclosure, not shown, by way of a threaded extension 15 of the lower end wall member 12. The pressure-proofed enclosure may be for example the casing of an electrical instrument on the exterior of a submarine, the interior components of which instrument are to be positioned or mechanically controlled by means of an exterior operating knob while the submarine is surfaced. Thus the end of the shaft connecting with the operating knob will be in a relatively high pressure zone when the submarine is submerged, and surrounded by sea water which is to be excluded from the gland structure because of the corrosive effect it would have on the metallic elements. A flexible cylindrical diaphragm member 16 surrounds the shaft within the housing forming a flexible side wall between the end wall members 11 and 12. The outer face of this flexible side wall is in communication with the outer space surrounding the housing, through the opening 17 in the side wall 13 of the housing. Fluid tight connection between the diaphragm 16 and the end wall members is effected by means of the flanges 18 and 19 integral with the diaphragm and extending radially outwardly between the upper and lower radially outwardly extending end flanges respectively of the side wall member and the adjacent end wall members over an area radially inward of the area of contact between the side wall flanges and the end wall members.

The upper end of the shaft 10 where it passes through the end wall member 11 is provided with a packing ring 20 of rubber-like material, preferably one not detrimentally affected by oil, such as neoprene secured in sealed relation to the wall member 11 and bearing inwardly around the shaft in rotary sealing relation. The lower end of the cylindrical diaphragm is closed by a seal-ring seat member 21 surrounding the shaft and extending into sealed connection with the diaphragm through an integral flange 22 which extends radially outwardly between the lower diaphragm flange 19 and the lower end-wall member 12. The flange 22 being of less diameter than the diaphragm flange 19 permits the outer under surface of the diaphragm flange to contact directly with the lower end-wall member 12 so that the amount of compression of the flange 19 between the side-wall member 13 and the end-wall will be definitely predetermined by the chosen depth of the rabbeted portion of the end-wall in which it is fitted. Contact between the overlapping portions of flanges 19 and 22 seals this connection, while a further seal between the bottom of flange 22 and the lower end-wall is provided by the gasket 23 which because of its position may be given ample radial width and consequently ample area of sealing contact with the flange 22 and lower end-wall member 12. An outer, vertical cylindrical face portion 24 on the seal-ring seat member 21 provides means for positively holding the lower flanged end of the diaphragm against radially inward movement. Similarly the upper flanged end of the diaphragm is held against inward displacement by a spread-ring member 25, the ring being held against axial displacement by a narrow radial flange extending outwardly between the upper end-wall member 11 and the adjacent end of the diaphragm. Choice of the depth of the rabbeted portion in the upper end of the side-wall member 13 into which the upper diaphragm flange fits definitely determines the amount of compression of the flange. Cap screws 26 clamp the flanged ends of the side-wall member 13 and the adjacent end wall members 11 and 12 together. A chamber 27 is thus formed by the cylindrical diaphragm 16, upper end wall 11 and sealing-seat member 21, the chamber being of variable volume due to the flexible wall portion afforded by the diaphragm 16.

For sealing the shaft where it passes out of the lower end of the chamber 27, a seal-ring 28 is provided having a running fit with an annular sealing-seat surface portion 29 on the seal-ring seat member 21. In the working embodiment here described, the seal-ring 28 was made of graphite. To avoid possibility of corrosion and other undesirable effects which would tend to arise at electrical conducting contacting areas should any water become present at such areas, the seal-ring 28 may be made of non-conducting material capable of providing a good low-friction running fit, for example a phenolic, thermo-setting plastic. The seal ring 28 is mounted in sealed relation with the shaft through a seal-ring holder 30 in the form of a cap having a cylindrical portion 31 embracing the upper periphery of the seal-ring. The portion 31 also together with a reduced cylindrical portion 32 embraces, and holds in fluid tight engagement with the shaft, a packing ring 33 of rubber-like material, preferably neoprene. Portions of the lower edge of the cap pressed in, as indicated in Fig. 2, at diametrically opposite points, form lugs 34, to fit in indentations 35 in the seal-ring and provide positive engagement between the holder and seal-ring. To resiliently urge the seal-ring 28 against the seat 30 and the packing ring 33 against the seal-ring, a compression spring 36 is provided which at its upper end abuts a collar 37 fixed to the shaft 10, and at its lower end abuts a shoulder portion 38 on the seal-ring holder 30.

A body of liquid 39 non-miscible with water and preferably a lubricating oil, substantially fills the space within the chamber 27. Filling of the chamber is facilitated by provision of a removable plug 40 in the upper end-wall member. Bearing for the shaft is provided at axially spaced points in the lower end-wall member and its extension, one at the ball bearing 41 and another at the juncture between the end extension 15 of the end-wall and a coupling head 42 carried at the lower end of the shaft for coupling the latter to an element to be moved.

In use, for example where the device is mounted on the outside of a submarine for controlling an element within the submarine or within a casing mounted on the submarine, to be protected against the entrance of sea water, an increase in outside pressure due to submergence of the submarine will be transmitted through the diaphragm 16 to the body of oil 39 within the chamber 27 while a decrease in outside pressure upon approach of the submarine to the surface will be similarly transmitted to the interior of the chamber. Thus the action of the diaphragm keeps the pressures substantially equal on both sides of the packing ring 20 with the result that there is practically little or no flow of oil past this packing. The diaphragm also allows the volume of the chamber to change as the oil expands or contracts due to temperature changes. The oil prevents the collapse of the diaphragm and lubricates the seals.

Escape of oil from the chamber 27 down along the shaft is substantially cut off by the main high-pressure seal effected between the engaging surfaces of the seal ring 28 and seat member 29, such very small amount of oil passing as is necessary to maintain lubrication but negligible in reduction of the volume of oil necessary to maintain isolation of the mechanical seal from the surrounding high pressure zone. Freedom from any objectionable loss of oil is well assured by usual routine inspection affording ample opportunity for renewal when necessary. Because an increase in pressure within the chamber 27 over that within the submarine tends to press the seal-ring against its seat member 29, effectiveness of the main seal is increased with increase of such pressure. Thus, in the use above mentioned by way of example, the compression spring 36 may be only of sufficient strength to insure adequate sealing at the lower pressures, resulting in minimum friction in operation, higher sealing pressure with some increase in friction occurring only during submergence when movement of the shaft is not required.

However, such increase is slight, due to the lubrication of the mechanical seal and the fact that with increase of the hydrostatic pressure on the seal, the pressure tending to force lubricant between the sealing surfaces is increased. The device theretofore is equally well adapted to use where the control effected by the shaft is that of a component mounted outside a submarine and exposed to the surrounding sea water, the operated component being connected to the upper end of the shaft outside of the housing in place of the knob and the shaft operated from the lower end within the submarine.

The modification shown in Fig. 3, is similar to that of Fig. 1, just described, except that the upper seal is a rotary pressure-proof seal of substantially the same construction as that of the lower seal, the two seals using the one compression spring 36 in common to resiliently urge the seal rings 43 and 28 in opposite directions against their respective seat members 44 and 21. The slight variation in structure of the top from that of the bottom seals consists in that the sealing-seat member 44 is in the form of a ring having a cross section similar to the seal ring 43 and is simply nested in an annular recess in the upper end-wall member 45 with a gasket element 46 between the seat member and the end-wall member, the seat member 44 being secured against turning by suitable means as by the usual key not shown.

The modification shown in Figs. 4 and 5 takes advantage of a case where a limited movement of the shaft is sufficient for the operation required. Here the diaphragm element 48 takes the form of an oil-filled, cylindrical envelope of rubber-like material, preferably neoprene. At its upper end, the envelope is clamped to and closed by the shaft 49 in sealed relation therewith, and at its lower end is clamped to the base 50 of the gland body in sealed relation with the latter, the base 50 and seal-ring seat member 58 forming a bottom wall separating the interior of the chamber from the low pressure zone. The body of oil within the envelope 48 is thus positively sealed from the outer space without interference with a rotational movement of the shaft 51 through an angle limited only by the flexibility of the envelope 48. To enable the envelope to twist with the shaft freely and without undue twisting strain on the side walls of the envelope these walls 48 are formed with vertical pleats as shown more clearly in Fig. 5. The mechanical seal 52 similar in construction to the preceding forms, is thus protected from contact with the sea water by the surrounding envelope and the body of oil therein. Flexibility and resiliency of the walls of rubber-like material of the envelope 48 permit the volume of the envelope to change and thus accommodate itself to temperature changes in the oil. Clamping of the envelope 48 to the upper part of the shaft is accomplished by means of the clamping ring 53 fixed to the shaft and the central bottom face portion of the handle 54 between which the inwardly extending flange 55 is clamped by the clamping nut 56 threaded on to the top end of the shaft and countersunk in a central recessed portion of the handle. A cylindrical wall 57 depending from the underside of the handle forms a protective housing for the envelope, open at the bottom.

The flexible envelope filled with oil protects the mechanical seal 52 from the surrounding external fluid in the present example sea water.

The invention described herein may be manufactured and used by or for the Government of the United States of America for governmental purposes without the payment of any royalty thereon or therefor.

What is claimed is:

1. A pressure proof gland for pressure proofing a shaft, comprising a housing having end portions through which the shaft passes, a side wall member surrounding the shaft between the end portions and joined to the end portions, a diaphragm in the form of a flexible cylindrical sleeve surrounding the shaft within the housing and having flanges at each end extending radially outwardly between the side wall member and the end portions to form a substantially fluid-tight flexible side wall connection between said end portions, an opening in said side wall to permit communication between the outer surface of the diaphragm and the space outside the housing, a seal-ring seat member surrounding the shaft and provided with a flange extending radially outwardly between one of said diaphragm flanges and one of said end portions and of less diameter than said one diaphragm flange to permit direct contact of an outer marginal portion of the diaphragm flange with the said one end portion, a gasket extending around the shaft between the seat-member flange and said one end portion, a second seat member surrounding the shaft near the other end-portion and bearing against said end portion through a gasket, a seal ring for each seat-member surrounding the shaft and having a running fit each with its respective seat-member, a holding member of rubber-like material for each seal ring embracing the shaft and bearing against its respective seal ring, a thrust cap for each holding member bearing axially and radially inwardly against the holder to transmit axial thrust through the holder to the seal ring and press the holder into fluid-sealing engagement with the shaft, a single compression spring between the thrust caps urging them away from each other to press their seal rings into sealing engagement with their seats respectively, and a body of lubricating oil filling the space within the diaphragm between the end portions.

2. A pressure proof gland for pressure proofing a shaft, comprising a housing having end portions through which the shaft passes, a side wall member surrounding the shaft between the end portions and joined to the end portions, a diaphragm in the form of a flexible cylindrical sleeve surrounding the shaft within the housing and having flanges at each end extending radially outwardly between the side wall member and the end portions to form a substantially fluid-tight flexible side wall connection between said end portions, an opening in said side wall to permit communication between the outer surface of the diaphragm and the space outside the housing, a seal-ring seat member surrounding the shaft and provided with a flange extending radially outwardly between one of said diaphragm flanges and one of said end portions and of less diameter than said one diaphragm flange to permit direct contact of an outer marginal portion of the diaphragm flange with the said one end portion, a gasket extending around the shaft between the seat-member flange and said one end portion, packing means between the shaft and the other end portion, a seal ring for said seat-member surrounding the shaft and having a running fit with the seat-member, a holding member of rubber-like material for the seal ring embracing the shaft and bearing against the seal ring, pressure transmitting means bearing radially and axially against the holder to press the holder into fluid sealing engagement with the shaft and to transmit axial thrust through the holder to the seal ring, a collar carried by the shaft, a compression spring between the collar and the pressure transmitting means to press the seal ring against the seat-member, and a body of lubricating oil filling the space within the diaphragm.

3. A pressure gland for pressure proofing a juncture between a casing wall and a shaft passing therethrough comprising a housing having upper and lower end-wall portions and a cylindrical side wall member joining the end walls, said lower end wall member being adapted to be secured to the casing wall, said side wall member having radially outwardly extending end flanges clamped directly against adjacent end wall portions, a shaft extending through the housing by way of said end walls, a flexible cylindrical diaphragm member surrounding the shaft within the housing and provided with upper and lower radially outwardly extending end flanges extending radially outwardly between the upper and lower flanges respectively of the side wall member and the adjacent end wall member over an area radially inward of the area of contact between the side wall flanges and the end wall members, a seal-ring seat member surrounding the shaft and having an integral flange extending radially outwardly between the lower diaphragm flange and the lower end wall member over an area radially inward of the area of contact between the lower diaphragm flange and the lower end wall, a gasket interposed between the said seat-member flange and the lower end wall, and a running seal between the shaft and the upper end wall member, said side wall member having an opening connecting the interior of the housing with outside space.

GEORGE K. C. HARDESTY.

REFERENCES CITED

The following references are of record in the file of this patent:

UNITED STATES PATENTS

| Number | Name | Date |
|---|---|---|
| 376,129 | Anderson | Jan. 10, 1888 |
| 1,752,757 | Schroeder | Apr. 1, 1930 |
| 1,835,877 | Joyce | Dec. 8, 1931 |
| 1,890,573 | Dubrovin | Dec. 13, 1932 |
| 2,012,049 | Mercier | Aug. 20, 1935 |
| 2,199,215 | Abercrombic | Apr. 30, 1940 |
| 2,202,351 | Loweke | May 28, 1940 |
| 2,200,413 | Christman et al | May 14, 1940 |
| 2,354,478 | Reinhardt | July 25, 1944 |